United States Patent Office 3,833,599
Patented Sept. 3, 1974

3,833,599
PROCESS FOR THE OXIDATION OF ALKYLPYRIDINES
Monique G. S. Hanotier-Bridoux and Jacques D. V. Hanotier, Brussels, Belgium, assignors to Labofina S.A., Brussels, Belgium
No Drawing. Filed Apr. 2, 1973, Ser. No. 347,049
Int. Cl. C07d 31/36
U.S. Cl. 260—295 R          8 Claims

ABSTRACT OF THE DISCLOSURE

A process for the oxidation of alkylpyridines of the formula

wherein R is an alkyl radical containing 1 to 2 carbon atoms and $m$ is an integer of 1 to 4, into corresponding pyridinecarboxylic acids, which process comprises reacting said alkylpyridine with a cobalt salt in a molar ratio of alkylpyridine to cobalt salt of lower than 2 while maintaining such a concentration of cobaltic salt that $2x-A$ is between 0.1 and 1.5 $x$ and A being respectively the molarity of cobaltic ions and of said cobalt salt in the reaction mixture, at a temperature of between 20 and 150° C., in an aliphatic carboxylic acid having from 2 to 4 carbon atoms and in the presence of molecular oxygen at a partial pressure of 0.2 to 20 atmospheres.

---

This invention relates to a process for the oxidation of alkylpyridines having the formula

wherein R is an alkyl radical having 1 or 2 carbon atoms and $m$ is an integer of 1 to 4, into corresponding pyridinecarboxylic acids.

Pyridinecarboxylic acids are used for the production of pharmaceutical products, namely nicotinic acid (or 3-pyridinecarboxylic acid) which is the antipellagara vitamin, and isonicotinic acid (or 4-pyridinecarboxylic acid) which in the form of its hydrazide is used for the treatment of tuberculosis. Also, pyridinedicarboxylic acids are used for the manufacture of coloring substances and pigments with the 2,3,5,6-pyridinetetracarboxylic acid being particularly useful for the production of synthetic resins.

Many methods are known for oxidizing alkylpyridines into pyridinecarboxylic acids. The partial oxidation of 3-methylpyridine by oxidizing agents such as potassium permanganate or potassium dichromate gives nicotinic acid with good yields, but the use of such methods is not commercially feasible due to high cost. The oxidation of alkylpyridines by nitric acid or sulphuric acid in the presence of catalysts is known also but has some disadvantages such as long reaction time, high amount of oxidizing agent required, high temperatures and excessive formation of byproducts, which are detrimental to the economic value of such methods. Additionally, other known processes for the oxidation of 3- or 4-methylpyridines are not suitable for the oxidation of polyalkylpyridines, the pyridinepolycarboxylic acids being decarboxylated at the temperatures required for such processes.

An object of this invention is to provide a new and improved method for the oxidation of alkylpyridines. Another object of this invention is to provide a new process for the oxidation of alkylpyridines into corresponding carboxylic acids with a particularly effective oxidizing agent which allows the reaction to be carried out at moderate temperatures. Still another object of the present invention is to provide a new process for the oxidation of alkylpyridines whereby decarboxylation and other side reactions is materially reduced. A further object of this invention is to provide a new and partcularly flexible oxidation process which can be applied to a wide variety of alkylpyridines, whatever the number and the position of the alkyl substituents. Additional objects will become apparent from the following description of the invention herein disclosed.

The present invention which fulfills the above and other objects is a process for oxidizing alkylpyridines of the formula

wherein R is an alkyl radical containing 1 to 2 carbon atoms and $m$ is an integer of 1 to 4, into corresponding pyridinecarboxylic acids, said process comprising reacting said alkylpyridine with a cobalt salt in a molar ratio lower than 2, while maintaining such a concentration of cobaltic ions that $2x-A$ is between 0.1 and 1.5, $x$, and A being respectively the molarity of the cobaltic ions and of the cobalt salt in the reaction mixture, such reaction being at a temperature of between 20 and 150° C. and carried out in the presence of an aliphatic carboxylic acid having from 2 to 4 carbon atoms and in the presence of molecular oxygen at a partial pressure of from 0.2 to 20 atmospheres.

It has been found quite unexpectedly that the conversion of alkypyridine can proceed only when the alkylpyridines and cobalt salt are used in a low molar ratio of alkylpyridine to cobalt salt, lower than 2. Therefore, it necessary to limit the amount of alkylpyridine used with respect to the amount of cobalt salt. This limitation can be realized by using a solvent in which both the alkylpyridines and cobalt salt are soluble. Such a solvent must be substantially inert against oxidation at the conditions used. Among the solvents which are useful to fulfill these conditions are the aliphatic carboxylic acids containing from 2 to 4 carbon atoms, e.g. acetic acid, propionic acid, etc. The preferred such solvent is acetic acid.

Another important feature of the present invention resides in the fact that in contacting an alkylpyridine with the cobalt salt in a solvent and within the temperature range hereinabove defined, effective oxidation takes place only when the molarity A of the cobalt salt and the molarity $x$ of the cobaltic ions in the reaction mixture are such that $2x-A$ is within the range 0.1 to 1.5. To achieve this, the cobalt salt must be used in a concentration of at least 0.1 when it is entirely a cobaltic salt. However, a high concentration of cobaltic ions is not enough by itself to secure an effective oxidation when the total concentration of cobalt is too high. The activity of the cobaltic ions is drastically reduced when $2x-A$ is lower than 0.1, even when A is high, and the activity is practically negligible when $2x-A=0$. Consequently, $2x-A$ may be considered as being the concentration of active cobalt species or of active Co(III) and will be referred to hereinafter as "active Co(III)."

When the concentration of alkylpyridine, cobalt salt and active Co(III) fulfil the conditions hereinabove specified, the oxidation of alkylpyridines proceeds at temperatures comprised between 20 and 150° C. but preferably is carried out at a temperature between 40 and 80° C., such temperatures lower than the decarboxylation temperature of the pyridinepolycarboxylic acids formed.

In the preferred mode of oxidizing alkylpyridines into corresponding pyridinecarboxylic acids, molecular oxygen must be introduced into the reaction zone. Pure oxygen or any oxygen-containing gas such as air may be used for this purpose. In most instances, the partial pressure of oxygen may be comprised between 0.2 and 20 atmospheres or higher.

The cobaltic salt used in the process of the present invention works in that it is reduced into its lower valency state as the reaction proceeds. Therefore, even when starting with a high concentration of cobaltic ions, the concentration would rapidly fall below the limit required for active oxidation to proceed. To achieve high yields of pyridine carboxylic acid in accordance with the present invention, it is necessary to regenerate the active cobalt (III) by reoxidizing the cobaltous species produced as a result of the reaction. This regeneration can be carried out continuously or intermittently, in the reaction vessel or separately, by known means, e.g. by anodic oxidation or by chemical agents such as ozone or peroxidic compounds, or by co-oxidation with an aldehyde

or a ketone

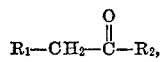

wherein $R_1$ and $R_2$ are lower alkyl radicals of 1 to 4 carbon atoms. A particularly convenient method of carrying out regeneration is to continuously supply acetaldehyde or methylethylketone into the reaction zone at a rate controlled such as to maintain the above defined desired level of active cobalt(III).

The cobalt salts which are used in the practice of the present invention are most often the salts of carboxylic acids. Such salts are particularly suitable due to their solubility in the reaction media. Although any of the cobalt salts of carboxylic acids may be employed, the salts of the lower fatty acids containing 2 to 4 carbon atoms are particularly advantageous. Such salts readily form the cobaltic form from the corresponding cobaltous form. From the standpoint of convenience, the cobalt salt employed is usually the cobaltic salt of the acid employed as a solvent as hereinabove discussed.

The present invention will be further described with reference to the following examples which are given only for purposes of illustration, and are not intended to limit the scope of said invention.

EXAMPLE 1

Into a stainless steel autoclave equipped with a mechanical agitating device, a heating jacket, a cooling coil, a gas inlet tube and a vent, there were charged 210 ml. of a solution containing 0.120 mole of 2-methylpyridine and 0.240 mole of cobalt acetate in acetic acid. The molar ratio of cobaltic ions to total cobalt in this solution was 0.91 with the concentration of active cobalt(III) being about 0.94 atom-gram per liter.

Air was introduced into the reaction mixture at a rate of 100 liters per hour while stirring and maintaining the pressure at 10 kg. per cm.$^2$. In order to ensure that the concentration of active cobalt(III) remained above 0.1 atom-gram per liter throughout the reaction, acetaldehyde was fed into the reaction mixture at a rate of 5 grams per hour as a 35 wt. percent solution in acetic acid. The mixture was heated at 60° C. for six hours.

At the end of the reaction period, the reaction mixture was cooled and withdrawn after depressurization of the autoclave. Active cobalt(III) determined on an aliquot was still at a concentration of 0.57 atom-gram per liter in spite of the fact that the initial solution had been diluted with the acetaldehyde solution.

To determine picolinic acid produced from 2-methylpyridine, another aliquot portion of the reaction mixture was treated with an aqueous solution of sodium hydroxide. Precipitated cobalt hydroxide was removed by centrifugation. The clear alkaline solution was extracted with ether to remove unreacted methylpyridine and then analyzed for picolinic acid by U.V. spectrophotometry. Unreacted methylpyridine and non-acidic products, when present, were determined on still another aliquot portion. From these analyses, it was found that 95% of the starting 2-methylpyridine had been transformed with a selectivity of 100% for picolinic acid.

EXAMPLE 2

The procedure of Example 1 was repeated except that 3-methylpyridine was substituted for 2-methylpyridine. The analysis of the reaction mixture showed that said 3-methylpyridine had been completely transformed with a selectivity of 92% for nicotinic acid.

EXAMPLE 3

The procedure of Example 1 was repeated except that 4-methylpyridine was substituted for 2-methylpyridine. The analysis of the reaction mixture showed that 95% of the 4-methylpyridine had been transformed with a selectivity of 94% for isonicotinic acid.

EXAMPLE 4

The procedure of Example 1 was repeated except that 0.060 mole of 3,4-dimethylpyridine was substituted for 2-methylpyridine. The analysis of the reaction mixture showed that the 3,4-dimethylpyridine had been completely transformed into a mixture of cinchomeronic acid (85%) and the corresponding monocarboxylic acids (15%).

EXAMPLE 5

The procedure of Example 1 was repeated except that 4-ethylpyridine was substituted for 2-methylpyridine. The analysis of the reaction showed that 99% of the starting 4-ethylpyridine had been transformed into a mixture of isonicotinic acid (79%) and 4-acetylpyridine (21%).

EXAMPLE 6

Into an autoclave equipped as described in Example 1, there were charged 210 ml. of a solution containing 0.040 mole of 2,4,6-trimethylpyridine and 0.240 mole of cobalt propionate in propionic acid. The same procedure as described in Example 1 was applied except that a temperature of 80° C. was employed.

The analysis of the reaction mixture showed that the starting 2,4,6-trimethylpyridine had been transformed with good efficiency into a mixture of mainly 2,4,6-pyridinetricarboxylic acid.

We claim:
1. A process for the oxidation of alkylpyridines of the formula

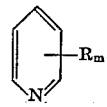

wherein R is an alkyl radical containing 1 to 2 carbon atoms and m is an integer of 1 to 3, into corresponding pyridinecarboxylic acids, which process consists essentially of reacting said alkylpyridine with a cobaltic salt of a lower alkanoic acid, in a molar ratio of alkylpyridine to cobaltic salt of lower than 2 while maintaining such a concentration of cobaltic salt that $2x-A$ is between 0.1 and 1.5, $x$ and $A$ being respectively the molarity of cobaltic ions and of said cobalt salt in the reaction mixture, at a temperature of between 20 and 150° C., in an aliphatic carboxylic acid having from 2 to 4 carbon atoms and in the presence of molecular oxygen at a partial pressure of 0.2 to 20 atmospheres.

2. The process of Claim 1 wherein said temperature is between 40 and 80° C.

3. The process of Claim 1 wherein the reaction is carried out in the presence of an aldehyde having the formula

wherein $R_1$ is a lower alkyl radical.

4. The process of Claim 1 wherein the reaction is carried out in the presence of a ketone having the formula

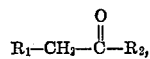

wherein $R_1$ and $R_2$ are lower alkyl radicals.

5. The process of Claim 1 wherein air is used as the oxygen source.

6. The process of Claim 1 wherein said cobalt salt is cobalt acetate.

7. The process of Claim 1 wherein the alkyl radicals of said alkylpyridine are methyl radicals.

8. The process of Claim 1 wherein said aliphatic carboxylic acid is acetic acid.

References Cited

UNITED STATES PATENTS

| | | | |
|---|---|---|---|
| 2,907,792 | 10/1959 | McIntyre | 260—523 |
| 2,946,801 | 7/1960 | Fields | 260—295 R |
| 2,959,613 | 11/1960 | Whitfield | 260—295 R |

ALAN L. ROTMAN, Primary Examiner

U.S. Cl. X.R.

260—295.5 R

UNITED STATES PATENT OFFICE
CERTIFICATE OF CORRECTION

Patent No. __3,833,599__   Dated __September 3, 1974__

Inventor(s) __Monique G. S. Hanotier-Bridoux et al.__

It is certified that error appears in the above-identified patent and that said Letters Patent are hereby corrected as shown below:

In the heading to the printed specification, after line 7, insert -- Claims priority, application France July 26, 1972, 7,226,867 --.

Signed and sealed this 21st day of January 1975.

(SEAL)
Attest:

McCOY M. GIBSON JR.
Attesting Officer

C. MARSHALL DANN
Commissioner of Patents